United States Patent [19]

Katsu

[11] Patent Number: 5,532,684
[45] Date of Patent: Jul. 2, 1996

[54] BIDIRECTIONAL COMMUNICATION SYSTEM IN A REMOTE CONTROL SYSTEM FOR AN AUDIO/VIDEO SYSTEM

[75] Inventor: Toshiyuki Katsu, deceased, late of Tokyo, Japan, by Yuko Katsu, legal representative

[73] Assignee: Pioneer Electronic Corporation, Tokyo, Japan

[21] Appl. No.: 189,300

[22] Filed: Feb. 1, 1994

[30] Foreign Application Priority Data

Feb. 12, 1993 [JP] Japan .................................... 5-024326

[51] Int. Cl.⁶ .................................................. H04Q 1/00
[52] U.S. Cl. ............................... 340/825.25; 340/825.24; 340/825.69; 340/825.72
[58] Field of Search ........................ 340/825.24, 825.25, 340/825.69, 825.72, 825.5, 825.52

[56] References Cited

U.S. PATENT DOCUMENTS

| | | | |
|---|---|---|---|
| 4,819,229 | 4/1989 | Pritty et al. ............................ | 340/825.5 |
| 4,855,730 | 8/1989 | Venners et al. ........................ | 340/825.24 |
| 5,054,022 | 10/1991 | von Steenbrugge .................. | 340/825.5 |
| 5,132,679 | 7/1992 | Kubo et al. .......................... | 340/825.24 |
| 5,223,825 | 6/1993 | Ikezaki ................................. | 340/825.52 |

*Primary Examiner*—Brian Zimmerman
*Attorney, Agent, or Firm*—Nikaido, Marmelstein, Murray & Oram

[57] ABSTRACT

A plurality of controlled units are connected with each other by communication lines for bidirectional communication. Each of the controlled units has a computer for controlling the bidirectional communication between the controlled units through the communication lines. The computer has a transmitting device responsive to a command from a remote controller to apply a response preparing data to the other controlled units, a receiving device for receiving response preparing data from the other controlled units. A precedence is give to each controlled unit. When the precedence of the unit itself is higher than that of the other controlled unit, a wireless response is applied to the remote controller.

2 Claims, 5 Drawing Sheets

BIDIRECTIONAL COMMUNICATION SYSTEM IN A REMOTE CONTROL SYSTEM FOR AN AUDIO/VIDEO SYSTEM

FIELD OF THE INVENTION

The present invention relates to a bidirectional communication system in a remote control system for an audio/video system in which a wireless bidirectional communication is performed between a remote controller and a plurality of controlled units.

BACKGROUND OF THE INVENTION

In a bidirectional remote control system, a remote controller is operated to apply a command by an infrared ray to a variety of controlled units. When the controlled units receive the command, each unit generates a response signal by an infrared ray as confirmation which is applied to the remote controller. If response signals are applied to the controller at the same time, response signals collide and interfere with each other, causing difficulty in the bidirectional communication.

In other to prevent the signals from colliding, in the bidirectional remote control system, a collision detecting measure, so called CSMA/CD (carrier sense media across/collision detect), is performed.

FIG. 6 shows a waveform of the response signal in the form of pulses intermittently generated from one of the controlled units. In the CSMA/CD system, the unit is temporarily shifted to a signal receiving state during a signal stop period R so as to detect if a response preparing signal from the other controlled unit or the remote controller is received. If the signal is received, the unit stops to generate the response signal for a predetermined time.

However, the response preparing signal may not be received from the other controlled unit because of the disposition of the unit. If the generated response preparing signal is not received, it is impossible to effectively use the CSMA/CD system. Furthermore, construction of circuits for the CSMA/CD system is complicated to increase manufacturing cost.

SUMMARY OF THE INVENTION

An object of the present invention is to provide a bidirectional remote control system in which in accordance with a command signal applied from a remote controller, one of the controlled units is properly selected so as to generate a response signal without colliding with other signals, and which may be manufactured at a low cost.

According to the present invention, there is provided a bidirectional communication system in a remote control system for an audio/video system including a remote controller and a plurality of controlled units controlled by the remote controller.

The controlled units are connected which each other by communication lines for bidirectional communication. Each of the controlled units has a signal receiving section for receiving a command from the remote controller, a signal transmitting section for transmitting a wireless response to the remote controller, computer means for controlling signal receiving and transmitting operation and the bidirectional communication between the controlled units through the communication lines.

A precedence is given to each controlled unit for responding to the command.

The computer means has transmitting means responsive to the command to apply a response preparing data including a unit identification code to other controlled units, receiving means for receiving response preparing data from other controlled units, determining means for determining whether the precedence of the unit itself higher than those of the other controlled units and for producing a precedent signal when the precedence of the unit is higher, and responding means responsive to the precedent signal for generating the wireless response.

Other objects and features of this invention will become understood from the following description with reference to the accompanying drawings.

DETAILED DESCRIPTION OF THE PREFERRED EMBODIMENT

Figure 1:
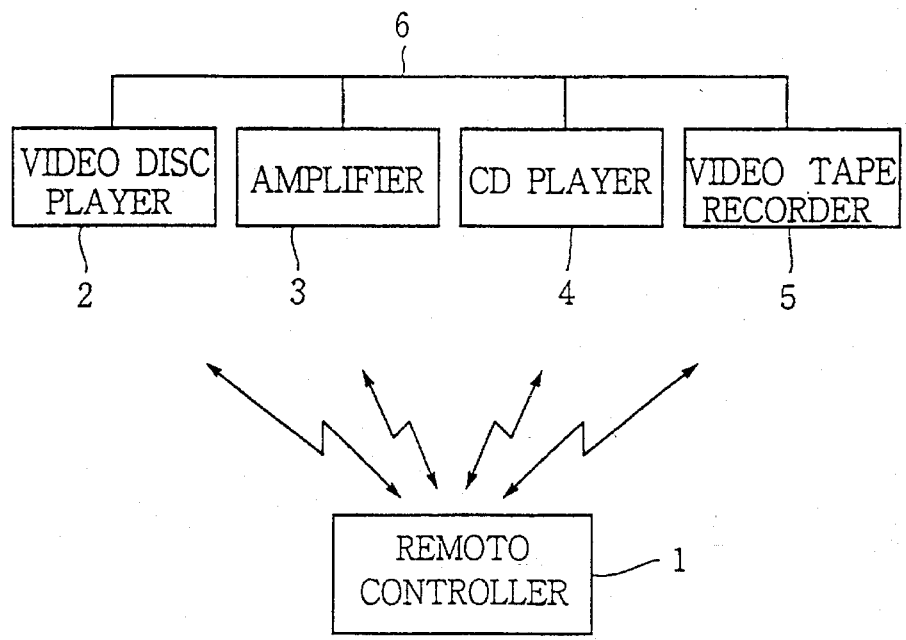
FIG. 1 is a schematic block diagram showing an audio/video system according to the present invention.

Referring to FIG. 1 showing an audio/video (A/V) system to which a bidirectional remote control system of the present invention is applied, the A/V system has a variety of the controlled units such as a video disc player 2, an amplifier 3, a CD player 4, and a video tape recorder 5, and a remote controller 1 operated to emit a command by an infrared ray for controlling the controlled units. The controlled units are connected to each other through a bidirectional communication bus line 6.

Figure 2:
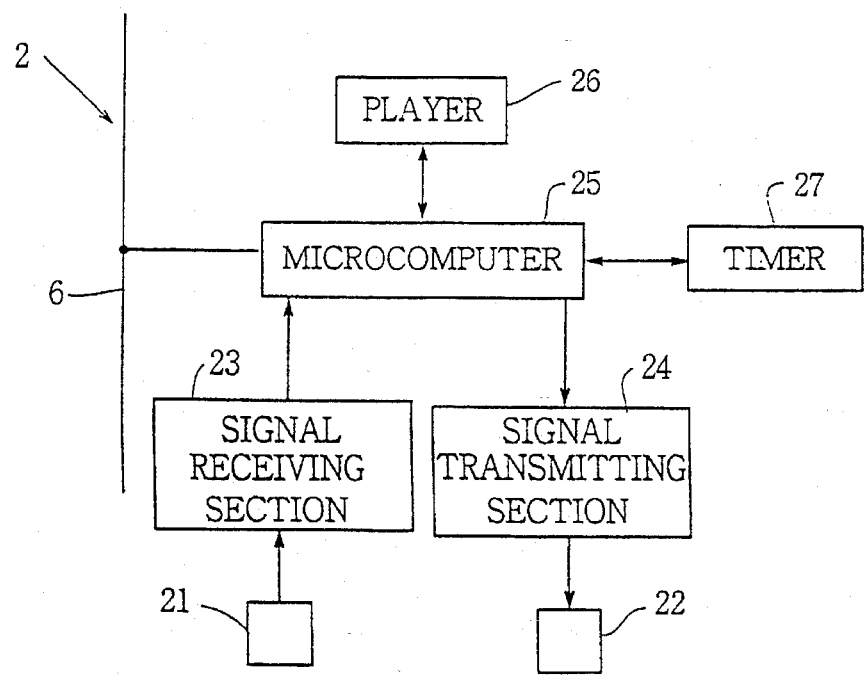
FIG. 2 is a block diagram showing one of the controlled units in the system.

Referring to FIG. 2, the video disc player 2 comprises a light receiving element 21 for receiving one of the commands by the infrared ray emitted from the remote controller 1, and a light emitting element 22 for emitting a response by the infrared ray to the remote controller 1. The light receiving elements 21 is connected to a signal receiving section 23 where a received command is modulated to a signal data. The light emitting element 22 is connected to a signal transmitting section 24 which operates the element 22 in accordance with a transmitting signal data. The signal receiving section 23 and the signal transmitting section 24 are connected to a microcomputer 25. The microcomputer 25 operates to control a player unit 26 in accordance with the signal data and to apply the transmitting signal data to the signal transmitting section 24. A timer 27 is connected to the microcomputer 25 for counting a predetermined time T.

Similarly, other controlled units 3, 4, 5 have light receiving and emitting elements, signal receiving and transmitting sections, microcomputer, and timer, as well as an amplifier unit, a CD player unit, and a recorder unit, respectively.

The bus line 6 is connected to the microcomputers of the respective units for applying a signal as a wire data to each other. The wire data includes a response preparing data, a response abandon data, and a response stop request data. Each data has at least start bit, data type code, controlled unit identification code, precedence code for determining the precedence, and end bit, as a predetermined format.

The precedence is determined such that the video disc player 2 is the first, the amplifier 3 is the third, the CD player 4 is the second, and the video tape recorder 5 is the fourth. The precedence code disclosed in Japanese Patent Application Laid-open 1-126846 may be used.

Furthermore, when the video disc player 2 is played, a power in the amplifier 3 is turned on through the bus line 6. When information on a tape in the video tape recorder 5 is recorded on a CD in the CD player 4, a recording signal is applied through the bus line 6.

The operation for the bidirectional communication will be described with reference to the flowcharts of FIGS. 3, 4a and 4b by way of example of the video disc player 2.

Figure 3:
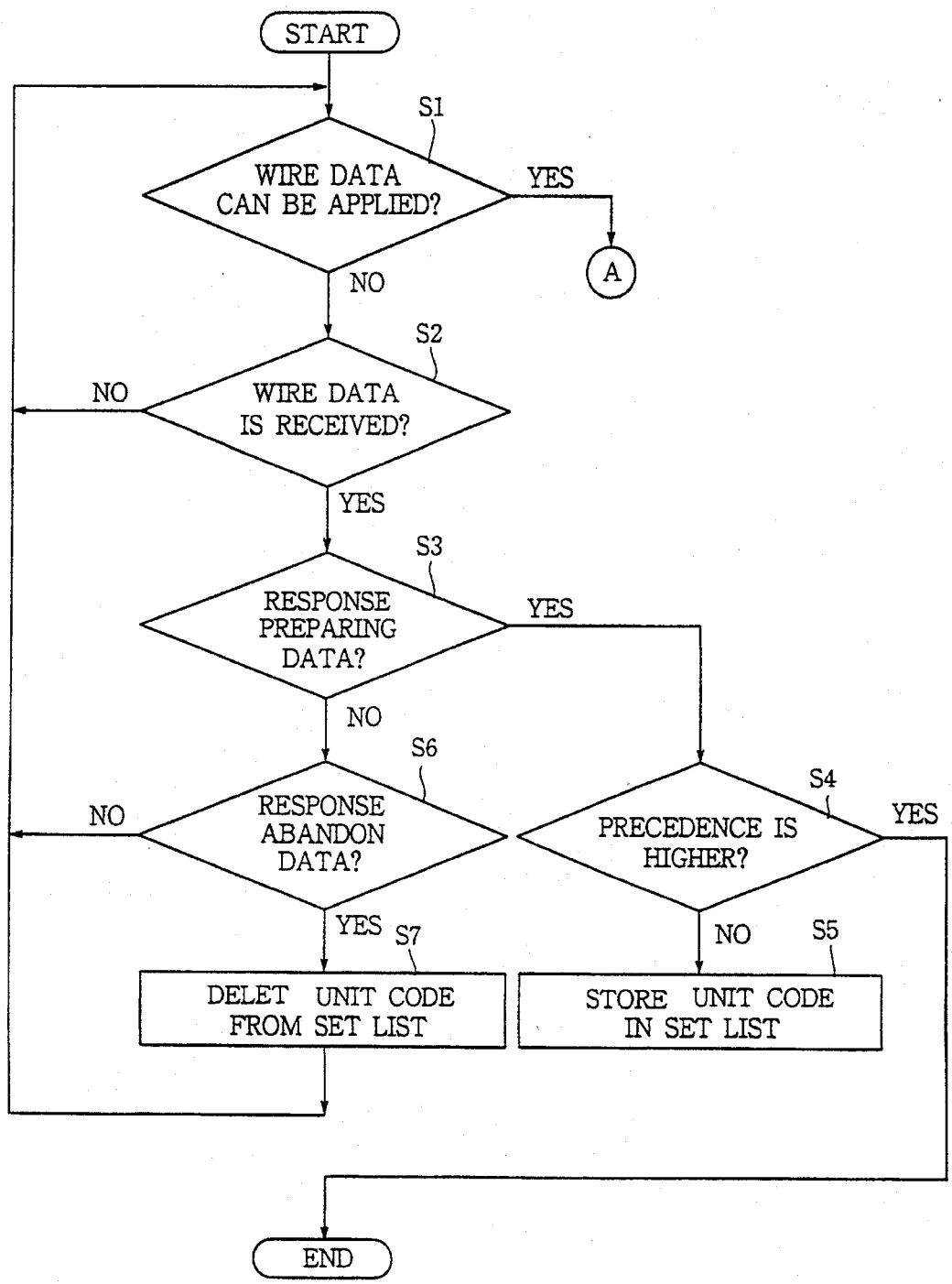
FIGS. 3, 4a and 4b are flowcharts describing the operation of the controlled unit.

When the microcomputer 25 receives the command from the remote controller 1 through the signal receiving section 23, a routine is started as shown in FIG. 3. At a step S1, it is determined whether the microcomputer 25 is allowed to generate a data through the bus line 6 or not. This is determined based on an output from a check function. If the bus line 6 is busy, the program proceeds to a step S2 where it is determined whether wire data from one of the other units is received through the bus line 6 or not. If the wire data is received, it is determined whether the received data is a response preparing data or not at a step S3. If yes, the program goes to a step S4 where it is determined whether the precedence of the data generating unit which generates the response preparing data is higher than the video disc player 2 or not. If the precedence of the player 2 is higher, an identification code of the lower-precedence controlled unit is stored in a memory of a response preparing data set list provided in the microcomputer 25 at a step S5. If the precedence of the controlled unit which generates the response preparing data is higher, the routine is terminated.

At the step S3, if the wire data is not the response preparing data, the program goes to a step S6 where it is determined whether the wire data is a response abandon data or not. If yes, an identification code of the controlled unit which generates the response abandon data is deleted from the response preparing set list memory at a step S7.

Figure 4:
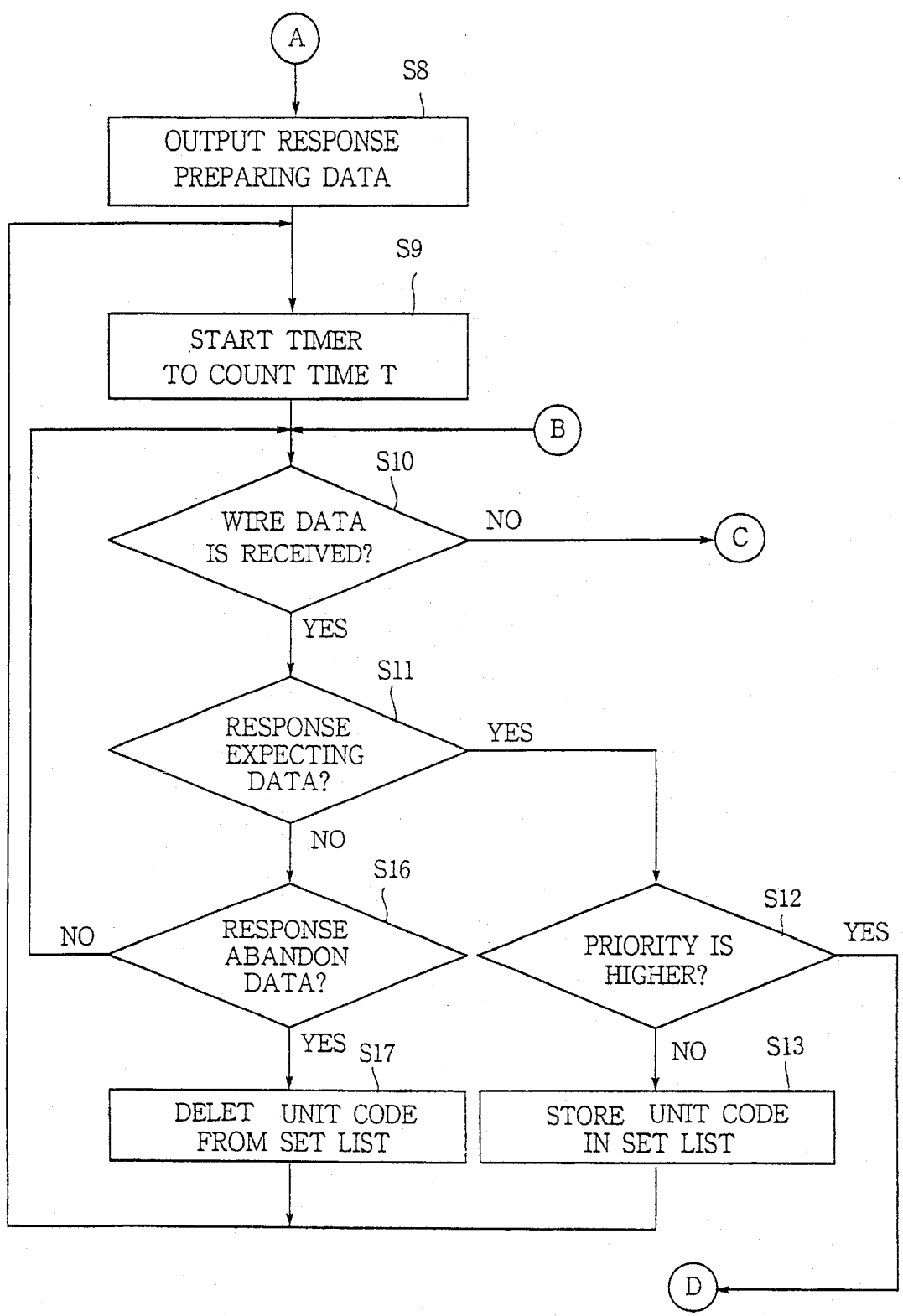
Figure 4:
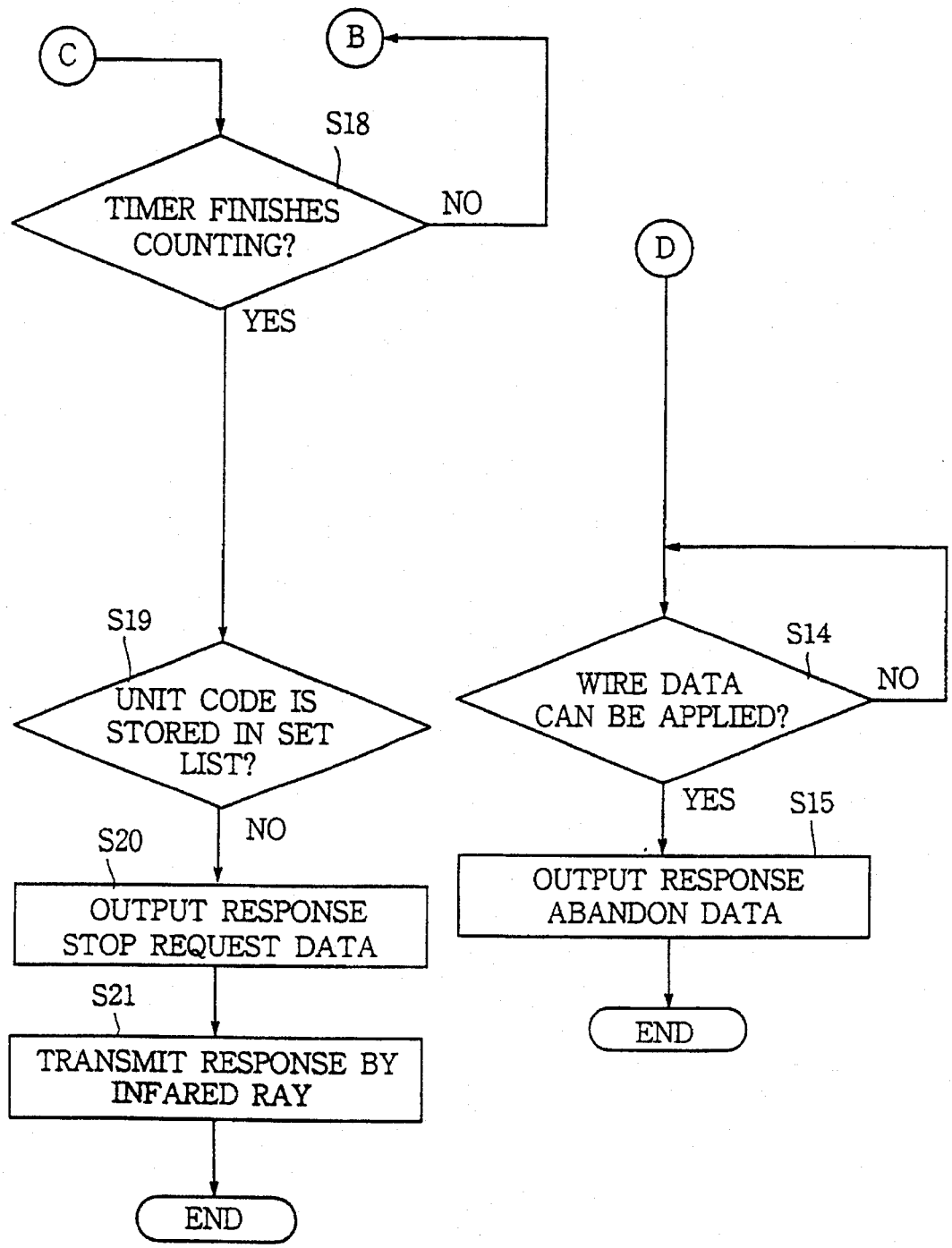

At the step S1, if the microcomputer is allowed to generate data through the bus line 6, the program proceeds to a step S8 shown in FIGS. 4a and 4b where the response preparing data is applied to the other controlled units through the bus line 6. At a step S9, the timer 27 is started to count a predetermined time T. At a step S10, it is determined whether the wire data is received or not. Thereafter, if the wire data is received, the response preparing data is determined at a step S11, the precedence of the controlled unit is compared at a step S12, an identification code of the controlled unit is stored in the set list memory at a step S13, the response abandon data is determined at a step S16, and the identification code of the controlled unit which generates the abandon data is deleted from the memory at a step S17, which are the same programs as the steps S2 to S5 and S6 and S7.

The program returns to the step S9 after steps S13 and S17 and the timer 27 is reset to start counting.

If the precedence of the other controlled unit is high, the program proceeds to a step S14 where it is determined whether data can be generated through the bus line 6 or not. If yes, the response abandon data is applied to the other controlled unit through the line 6 at a step S15, and the routine is terminated.

At the step S10, if the wire data is not received, the program proceeds to a step S18 where it is determined whether the timer 27 finishes counting the time T. If not, the program returns to the step S10 where it is determined whether the wire data is applied from the other controlled unit during the time T after the generation of the response preparing data. It will be seen that the time T represents a time necessary for receiving a response of the other controlled unit to the wire data of the player 2.

If the counting is finished at the step S18, it is determined whether the data remains in the memory or not at a step S19. If yes, it means that the response abandon data is not generated in spite of a lower-precedence of the other controlled unit. At a step S20, a response stop request data is generated through the bus line 6 and the response abandon data is generated by interruption. Then, the routine is terminated.

The response stop request data can be applied to the controlled unit the identification code which remains in the set list memory.

At the step S19, if no identification code remains in the memory, the microcomputer 25 applies a response transmitting command to the signal transmitting section 24 at a step S21. Thus, a response by the infrared ray is emitted from the light emitting element 22 to the remote controller 1.

Figure 5:
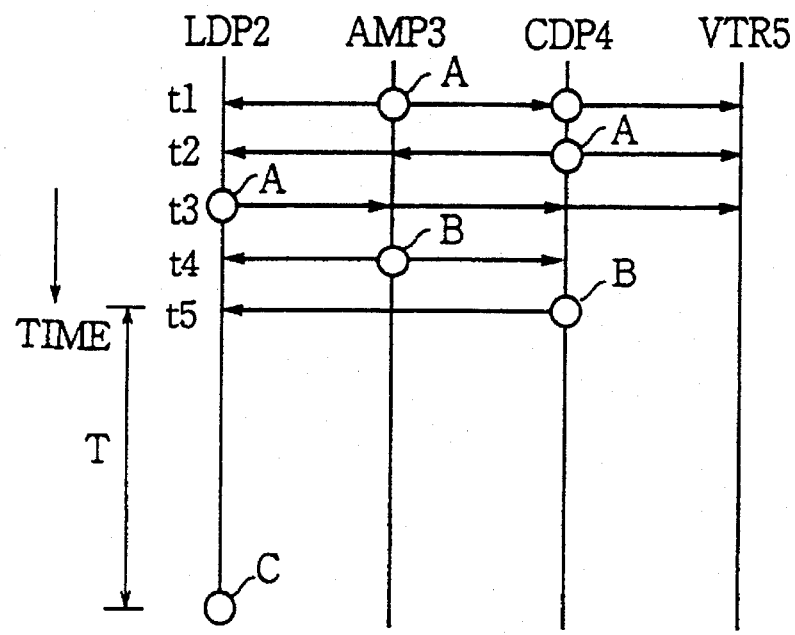
FIG. 5 is a diagram showing operating timings of the controlled units.
Figure 6:
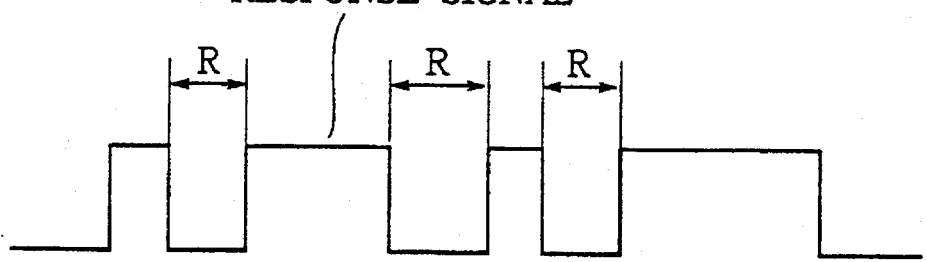
FIG. 6 shows a pulse waveform of a response signal according to a conventional system.

The operation of the controlled units in accordance with precedences will be described with reference to FIG. 5.

When the command is applied from the remote controller 1, the amplifier (AMP) 3 produces the response preparing data A at a time t1. At the time t1, precedences of the video disc player (LDP) 2 and the CD player (CDP) 4 are higher than the amplifier 3. Thus, the response preparing data can be produced from the players 2 and 4. Since the precedence of the video tape recorder 5 is below the amplifier 3, the response preparing data is not produced from the recorder 5. At a time t2, the CD player 4 generates the data A so that the amplifier 3 generates the abandon data B. Since the precedence of the video disc player 2 is higher than the CD player 4, the player 2 produces the response preparing data A at a time t3. Accordingly, the amplifier 3 produces the abandon data B at a time t4 and the CD player 4 generates the abandon data B at a time t5. Thus, identification code of the controlled unit does not exist in the memory. A signal C is produced from the video disc player 2 when the time T has passed after the time t5 and applied to the remote controller 1.

In the above described embodiment, precedence code is included in the response preparing data. In place of the precedence code, a table of the precedences of the controlled units is stored in a memory so as to discriminate the precedence in accordance with the table and the identification code in the response preparing data.

In the present invention, the controlled unit is selected in accordance with the precedence of the unit in response to a command by the remote controller. Since the responses are prevented from being produced at the same time, an effective bidirectional communication is ensured. The construction is simplified to reduce the manufacturing cost.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. A bidirectional communication system in a remote control system for an audio/video system including a remote controller and a plurality of controlled units controlled by the remote controller, comprising:

communication lines connecting the controlled units with each other for bidirectional communication;

each of the controlled units having a signal receiving section for receiving a command from the remote controller, a signal transmitting section for transmitting a wireless response to the remote controller, computer means for controlling the signal receiving operation and the signal transmitting operation and the bidirectional communication between the controlled units through the communication lines, and being given a precedence for responding to the command;

the computer means having, transmitting means responsive to the command for applying a response preparing data, including a unit identification code, to other controlled units through the communication line, receiving means for receiving the response preparing data from other controlled units through the communication line, determining means for determining whether the precedence of the unit itself is higher than those of the other controlled units and for producing a precedent signal when the precedence of the unit is higher, responding means responsive to the precedent signal for generating the wireless responses, and abandon means for applying a response abandon data to the other controlled units at a time when it is determined that the precedence of the unit is lower than those of the other controlled units after applying the response preparing data to the other controlled units.

2. A bidirectional communication system in a remote control system for an audio/video system including a remote controller and a plurality of controlled units controlled by the remote controller, comprising:

communication lines connecting the controlled units with each other for bidirectional communication;

each of the controlled units having a signal receiving section for receiving a command from the remote controller, a signal transmitting section for transmitting a wireless response to the remote controller; computer means for controlling the signal receiving operation and the signal transmitting operation and the bidirectional communication between the controlled units through the communication lines, and being given a precedence for responding to the command;

the computer means having, transmitting means responsive to the command for applying a response preparing data, including a unit identification code, to other controlled units through the communication line, receiving means for receiving the response preparing data from other controlled units through the communication line, determining means for determining whether the precedence of the unit itself is higher than those of the other controlled units and for producing a precedent signal when the precedence of the unit is higher, responding means responsive to the precedent signal for generating the wireless response, abandon means for applying a response abandon data to the other controlled units when the precedence of the unit is lower than the precedence of the other controlled units, wherein the abandon means applies a response abandon data to the other controlled units at a time when it is determined that the precedence of the unit is lower than those of the other controlled units after applying the response preparing data to the other controlled units.

* * * * *